United States Patent
Davis et al.

(10) Patent No.: US 8,844,431 B2
(45) Date of Patent: Sep. 30, 2014

(54) ROLLER GRILL DIVIDER

(75) Inventors: Raymond E. Davis, Dallas, TX (US); Clifton Glenn Hampton, Dallas, TX (US)

(73) Assignee: ADCO Industries—Technologies, L.P., Dallas, TX (US)

( * ) Notice: Subject to any disclaimer, the term of this patent is extended or adjusted under 35 U.S.C. 154(b) by 0 days.

(21) Appl. No.: 13/492,626

(22) Filed: Jun. 8, 2012

(65) Prior Publication Data

US 2013/0327227 A1 Dec. 12, 2013

(51) Int. Cl.
*A47J 43/18* (2006.01)

(52) U.S. Cl.
USPC .......................................................... 99/441

(58) Field of Classification Search
USPC ........... 99/339, 393, 402, 422, 423, 441, 426, 99/443 R, 443 C, 448, 449; 220/529, 533, 220/543, 544, 546
See application file for complete search history.

(56) References Cited

U.S. PATENT DOCUMENTS

| | | | | | |
|---|---|---|---|---|---|
| 78 | A | * | 11/1836 | Sizer | 99/339 |
| 21,157 | A | * | 8/1858 | Thomas | 99/402 |
| 585,432 | A | * | 6/1897 | Devoll | 99/402 |
| 594,394 | A | * | 11/1897 | Gibbons | 99/390 |
| 598,512 | A | * | 2/1898 | Henis et al. | 99/422 |
| 608,144 | A | * | 7/1898 | Porter | 220/23.8 |
| 614,116 | A | * | 11/1898 | Losee | 15/146 |
| 617,487 | A | * | 1/1899 | Keller | 99/402 |
| 629,127 | A | * | 7/1899 | Geer | 99/402 |
| 630,014 | A | * | 8/1899 | Talbot | 99/402 |
| 1,391,268 | A | * | 9/1921 | O'Brien | 99/421 HH |
| 1,494,654 | A | * | 5/1924 | Weir | 392/434 |
| 1,518,067 | A | * | 12/1924 | Hicks | 392/376 |
| 1,761,497 | A | * | 6/1930 | Smith | 224/222 |
| 2,014,384 | A | * | 9/1935 | Kruttschnitt | 99/405 |
| 2,051,456 | A | * | 8/1936 | Muir et al. | 392/376 |
| 2,185,979 | A | * | 1/1940 | Dumas | 99/423 |
| 2,197,982 | A | * | 4/1940 | O'Brien | 211/153 |
| 2,253,434 | A | | 8/1941 | Kernick | |
| 2,280,371 | A | * | 4/1942 | Bishop | 211/184 |
| 2,290,572 | A | * | 7/1942 | Rakov | 126/339 |
| 2,308,629 | A | * | 1/1943 | Rosenberg | 211/131.1 |
| 2,453,385 | A | * | 11/1948 | Rone | 99/423 |
| 2,455,967 | A | * | 12/1948 | Adams | 219/526 |
| 2,574,411 | A | * | 11/1951 | Pashby | 220/759 |
| 2,575,188 | A | * | 11/1951 | Schell | 99/449 |
| 2,577,963 | A | * | 12/1951 | Hagopian | 126/25 A |
| 2,578,034 | A | * | 12/1951 | Baltzell | 99/327 |
| 2,579,258 | A | * | 12/1951 | Heckert | 99/349 |
| 2,602,392 | A | * | 7/1952 | Panken | 99/427 |
| 2,604,842 | A | * | 7/1952 | Dolce | 99/423 |
| 2,631,525 | A | * | 3/1953 | Finizie | 99/423 |
| 2,656,867 | A | * | 10/1953 | Aguilar et al. | 99/637 |
| 2,697,395 | A | | 12/1954 | Steriss | |
| 2,724,524 | A | * | 11/1955 | Moore | 220/533 |

(Continued)

*Primary Examiner* — Henry Yuen
*Assistant Examiner* — Eric Stapleton
(74) *Attorney, Agent, or Firm* — Fish & Richardson P.C.

(57) ABSTRACT

A roller grill divider assembly includes a frame adapted to rest upon on a roller grill and one or more dividers securable to the frame. The roller grill includes multiple tubes having outer surfaces adapted to transfer heat to a pre-cooked food product. The one or more dividers are in contact with the multiple tubes and are adapted to adjust along a length of the frame to multiple positions such that the pre-cooked food product is substantially prevented from passing beneath the one or more dividers.

20 Claims, 6 Drawing Sheets

(56) References Cited

U.S. PATENT DOCUMENTS

| | | | |
|---|---|---|---|
| 2,745,363 A * | 5/1956 | Balton | 425/334 |
| 2,905,076 A * | 9/1959 | Del Francia | 99/443 R |
| 2,933,934 A * | 4/1960 | Haroldson | 474/180 |
| 2,944,138 A * | 7/1960 | Goff | 392/353 |
| 2,995,644 A * | 8/1961 | Zellers | 219/473 |
| 3,101,080 A * | 8/1963 | Lorbacher | 126/25 A |
| 3,144,016 A * | 8/1964 | Basci | 126/265 |
| 3,145,850 A * | 8/1964 | Ciborowski | 211/133.5 |
| 3,221,139 A * | 11/1965 | Orr | 392/353 |
| 3,245,398 A * | 4/1966 | Baker | 126/152 R |
| 3,298,303 A * | 1/1967 | Waller | 99/423 |
| 3,329,281 A * | 7/1967 | Ball | 211/153 |
| 3,367,510 A * | 2/1968 | Krikorian | 211/133.5 |
| 3,472,156 A * | 10/1969 | Bardeau | 99/423 |
| 3,492,938 A * | 2/1970 | Kaffer et al. | 99/339 |
| 3,497,081 A * | 2/1970 | Field | 211/184 |
| 3,501,019 A * | 3/1970 | Armstrong et al. | 211/184 |
| 3,504,452 A * | 4/1970 | Shea | 38/143 |
| 3,530,997 A * | 9/1970 | Djorup | 211/184 |
| 3,559,815 A * | 2/1971 | Huddleston | 211/184 |
| 3,611,913 A * | 10/1971 | McGinley | 99/349 |
| 3,637,085 A * | 1/1972 | Ball | 211/153 |
| 3,639,077 A * | 2/1972 | Slates | 416/111 |
| 3,643,808 A * | 2/1972 | Ryan et al. | 211/59.2 |
| 3,667,449 A * | 6/1972 | Persinger et al. | 126/41 R |
| 3,682,088 A * | 8/1972 | Paniez | 99/277.2 |
| 3,691,345 A * | 9/1972 | Needham et al. | 392/436 |
| 3,692,351 A | 9/1972 | Christopher et al. | |
| 3,703,964 A * | 11/1972 | Field | 211/184 |
| 3,739,918 A * | 6/1973 | Kreitzburg | 211/44 |
| 3,756,219 A | 9/1973 | Snyder et al. | |
| 3,854,392 A * | 12/1974 | Eason | 99/421 H |
| 3,858,500 A * | 1/1975 | Rohm et al. | 99/504 |
| 3,872,976 A * | 3/1975 | Moore et al. | 211/184 |
| 3,981,233 A | 9/1976 | Nugarus | |
| 4,023,682 A * | 5/1977 | Niece | 211/184 |
| 4,154,154 A * | 5/1979 | Vivian | 99/421 HH |
| 4,240,604 A * | 12/1980 | Brach | 248/316.5 |
| 4,318,487 A * | 3/1982 | McCarthy | 211/134 |
| 4,350,871 A * | 9/1982 | Davis et al. | 392/375 |
| 4,370,920 A * | 2/1983 | Henriques et al. | 99/339 |
| 4,516,485 A * | 5/1985 | Miller | 99/339 |
| 4,541,406 A * | 9/1985 | DaSambiagio | 126/9 R |
| 4,624,432 A * | 11/1986 | Salacuse | 248/316.5 |
| 4,653,716 A * | 3/1987 | Sakaguchi | 248/316.5 |
| 4,683,813 A * | 8/1987 | Schultz | 99/353 |
| 4,717,104 A * | 1/1988 | Lee | 248/235 |
| 4,729,485 A * | 3/1988 | Kulbersh | 211/184 |
| 4,781,349 A * | 11/1988 | Remmers | 248/249 |
| 4,926,838 A * | 5/1990 | Sells et al. | 126/25 A |
| D312,389 S * | 11/1990 | Remmers | D8/381 |
| 5,031,602 A * | 7/1991 | Vick | 126/25 R |
| 5,035,332 A * | 7/1991 | Stravitz | 211/40 |
| 5,050,578 A * | 9/1991 | Luebke et al. | 126/21 A |
| 5,058,493 A * | 10/1991 | Basek et al. | 99/339 |
| 5,070,777 A * | 12/1991 | Novak | 99/482 |
| 5,082,125 A * | 1/1992 | Ninni | 211/184 |
| 5,099,821 A * | 3/1992 | Ceravolo | 126/25 R |
| 5,105,726 A * | 4/1992 | Lisker | 99/340 |
| 5,117,748 A | 6/1992 | Costa | |
| 5,172,682 A * | 12/1992 | Luebke et al. | 126/21 A |
| 5,277,387 A * | 1/1994 | Lewis et al. | 248/74.2 |
| 5,293,859 A * | 3/1994 | Lisker | 126/26 |
| 5,404,795 A * | 4/1995 | Coble | 99/339 |
| 5,415,297 A * | 5/1995 | Klein et al. | 211/40 |
| 5,458,051 A | 10/1995 | Alden et al. | |
| D364,047 S * | 11/1995 | Bucher | D6/407 |
| 5,463,938 A * | 11/1995 | Sarukawa et al. | 99/352 |
| 5,520,098 A * | 5/1996 | Fabrikant et al. | 99/394 |
| 5,536,518 A * | 7/1996 | Rummel | 426/523 |
| 5,549,040 A | 8/1996 | Naramura | |
| 5,560,286 A * | 10/1996 | Fabrikant et al. | 99/426 |
| 5,615,666 A * | 4/1997 | Ransom | 126/25 R |
| 5,653,162 A * | 8/1997 | Lunde | 99/450 |
| 5,669,290 A * | 9/1997 | Natsumi et al. | 99/421 H |
| 5,722,315 A | 3/1998 | Naramura | |
| 5,740,724 A * | 4/1998 | Fabrikant et al. | 99/426 |
| 5,758,568 A * | 6/1998 | Moravec | 99/349 |
| 5,782,173 A * | 7/1998 | Fabrikant et al. | 99/426 |
| 5,870,949 A * | 2/1999 | Cimperman et al. | 99/559 |
| 5,901,637 A * | 5/1999 | Glucksman et al. | 99/326 |
| 5,950,614 A * | 9/1999 | Guinnane | 126/25 R |
| 5,970,856 A * | 10/1999 | Fabrikant et al. | 99/426 |
| 6,047,633 A * | 4/2000 | Khaytman | 99/421 V |
| 6,065,394 A * | 5/2000 | Gelderman | 99/449 |
| 6,065,464 A * | 5/2000 | Zajec | 126/25 R |
| 6,089,385 A * | 7/2000 | Nozawa | 211/59.2 |
| 6,101,927 A * | 8/2000 | Kurmlavage | 99/343 |
| 6,166,353 A | 12/2000 | Senneville et al. | |
| D439,465 S * | 3/2001 | Mok | D6/630 |
| 6,234,328 B1 * | 5/2001 | Mason | 211/90.02 |
| 6,237,472 B1 * | 5/2001 | Gates | 99/446 |
| 6,248,010 B1 * | 6/2001 | Sirgo et al. | 452/5 |
| 6,393,971 B1 * | 5/2002 | Hunot et al. | 99/341 |
| 6,402,106 B1 * | 6/2002 | Padiak | 248/221.11 |
| 6,439,109 B1 * | 8/2002 | Rehill | 99/421 R |
| 6,450,325 B1 * | 9/2002 | Devnani | 198/788 |
| 6,474,223 B2 * | 11/2002 | Kurmlavage | 99/343 |
| 6,523,463 B1 * | 2/2003 | Hogle | 99/482 |
| 6,523,664 B2 * | 2/2003 | Shaw et al. | 193/35 R |
| 6,688,301 B1 * | 2/2004 | McNeill | 126/25 R |
| 6,707,015 B2 * | 3/2004 | Huegerich et al. | 219/494 |
| 6,782,802 B2 | 8/2004 | Hunot et al. | |
| 6,818,868 B2 * | 11/2004 | Grohs | 219/450.1 |
| 6,838,644 B1 * | 1/2005 | Chung-Ting | 219/393 |
| 6,844,529 B2 * | 1/2005 | Grohs | 219/450.1 |
| 7,097,052 B2 * | 8/2006 | Lau | 211/184 |
| 7,114,606 B2 * | 10/2006 | Shaw et al. | 193/35 R |
| 7,147,293 B2 * | 12/2006 | Bienick et al. | 312/408 |
| 7,182,209 B2 * | 2/2007 | Squitieri | 211/59.2 |
| 7,237,856 B2 * | 7/2007 | Bienick et al. | 312/408 |
| 7,334,517 B2 * | 2/2008 | Gaskill et al. | 99/339 |
| 7,367,261 B2 * | 5/2008 | Gaskill et al. | 99/339 |
| 7,520,211 B2 * | 4/2009 | Hunot et al. | 99/341 |
| 7,591,220 B2 | 9/2009 | Sheridan | |
| 7,703,390 B2 * | 4/2010 | Kurmlavage | 99/450.4 |
| 8,276,772 B2 * | 10/2012 | Kim | 211/151 |
| 8,376,154 B2 * | 2/2013 | Sun | 211/151 |
| 2001/0045345 A1 * | 11/2001 | Luigi | 198/832 |
| 2002/0005120 A1 * | 1/2002 | Kurmlavage | 99/342 |
| 2002/0017202 A1 | 2/2002 | Hunot et al. | |
| 2002/0148359 A1 * | 10/2002 | Hunot et al. | 99/341 |
| 2002/0195002 A1 * | 12/2002 | Dominguez et al. | 99/357 |
| 2003/0010737 A1 * | 1/2003 | Lee | 211/184 |
| 2003/0132088 A1 * | 7/2003 | Watanabe et al. | 198/835 |
| 2003/0132178 A1 * | 7/2003 | Jay et al. | 211/59.2 |
| 2003/0197001 A1 * | 10/2003 | Grohs | 219/450.1 |
| 2004/0035850 A1 * | 2/2004 | Grohs | 219/450.1 |
| 2004/0154606 A1 * | 8/2004 | McNeill | 126/25 R |
| 2004/0255561 A1 * | 12/2004 | Heilman | 53/569 |
| 2005/0049096 A1 * | 3/2005 | Eck | 474/168 |
| 2005/0051037 A1 * | 3/2005 | Gaskill et al. | 99/421 R |
| 2005/0061161 A1 * | 3/2005 | Hunot et al. | 99/441 |
| 2005/0064972 A1 * | 3/2005 | Rusheidat et al. | 474/168 |
| 2005/0133471 A1 * | 6/2005 | Squitieri | 211/59.2 |
| 2005/0260319 A1 | 11/2005 | Khalaf | |
| 2006/0037486 A1 * | 2/2006 | Kurmlavage | 99/538 |
| 2006/0042474 A1 * | 3/2006 | Perttola | 99/441 |
| 2006/0115557 A1 | 6/2006 | Schlienger et al. | |
| 2006/0231517 A1 * | 10/2006 | Bothun et al. | 211/151 |
| 2006/0260477 A1 * | 11/2006 | Jackman et al. | 99/485 |
| 2007/0059413 A1 | 3/2007 | Hartmann | |
| 2007/0102418 A1 | 5/2007 | Swank et al. | |
| 2007/0232427 A1 * | 10/2007 | Ueno et al. | 474/199 |
| 2008/0022799 A1 * | 1/2008 | Kashimura | 74/460 |
| 2008/0022800 A1 * | 1/2008 | Kobayashi | 74/462 |
| 2008/0098906 A1 * | 5/2008 | Davis | 99/482 |
| 2008/0282903 A1 | 11/2008 | Gonzalez | |
| 2009/0092718 A1 * | 4/2009 | Mendenhall et al. | 426/383 |
| 2009/0277299 A1 * | 11/2009 | Gmirya | 74/665 A |
| 2010/0064874 A1 | 3/2010 | Nagorka | |
| 2010/0078402 A1 * | 4/2010 | Davis et al. | 211/184 |
| 2010/0122630 A1 * | 5/2010 | Nimerovskiy | 99/421 H |
| 2010/0183784 A1 | 7/2010 | Van Blokland | |

(56) References Cited

U.S. PATENT DOCUMENTS

| | | |
|---|---|---|
| 2010/0255158 A1 | 10/2010 | Luther |
| 2010/0264346 A1* | 10/2010 | Bussear .................... 251/250.5 |
| 2010/0297321 A1* | 11/2010 | Strauch ........................ 426/523 |
| 2011/0056387 A1* | 3/2011 | Kurmlavage .................. 99/352 |
| 2012/0103319 A1* | 5/2012 | Sheridan ....................... 126/181 |
| 2012/0186460 A1* | 7/2012 | Humphrey et al. ............ 99/339 |

\* cited by examiner

ROLLER GRILL DIVIDER

TECHNICAL BACKGROUND

This disclosure relates to a roller grill divider.

BACKGROUND

Various apparatus are used to partition cooking areas on which food items may be cooked or heated, such as, for example, tubular heating members of a roller grill. As the roller grill tubes rotate, food items may be in contact with the roller grill tubes and may, in some instances, contact one another. In some examples, it may be desirable to separate food items having differing sizes, food items having distinct flavors, or food items having contents that are susceptible to varying degrees of perishableness. In some instances, a cooking and/or heating area provided by multiple roller grill tubes may be subdivided using a roller grill divider apparatus that is permanently integrated with the side housings of the roller grill. In other examples, a cooking and/or heating area provided by multiple roller grill tubes may be subdivided using a roller grill divider apparatus providing discreet sectional positions, which limit the degree of separation that can be achieved between various food items and prescribes various locations at which the food items may be positioned atop the roller grill tubes. In some examples, a cooking and/or heating area provided by multiple roller grill tubes may be subdivided using a roller grill divider apparatus that contacts the roller grill tubes over a majority of a circumference of the roller grill tubes. Such roller grill divider apparatus can, in some instances, be particularly susceptible to rapid and severe mechanical wear and may be difficult to remove from the roller grill tubes.

SUMMARY

In one general embodiment, a device includes a frame adapted to rest upon on a roller grill and one or more dividers securable to the frame. The roller grill includes multiple tubes having outer surfaces adapted to transfer heat to a pre-cooked food product. The one or more dividers are in contact with the multiple tubes and are adapted to adjust along a length of the frame to multiple positions such that the pre-cooked food product is substantially prevented from passing beneath the one or more dividers.

In another general embodiment, a roller grill includes a housing structure, multiple tubes having outer surfaces adapted to transfer heat to a pre-cooked food product, and a roller grill divider. The roller grill divider includes a frame and a divider securable to the frame, where the divider is adapted to adjust to two or more positions along a length of the frame and is in contact with the multiple tubes.

In yet another general embodiment, a roller grill divider assembly includes a support structure adapted to rest adjacent multiple roller grill heating tubes of a roller grill and one or more partition members securable to the support structure that extend transverse to a lengthwise dimension of the multiple roller grill heating tubes. The one or more partition members are adapted to adjust to multiple positions along a length of the support structure and to contact the multiple roller grill heating tubes.

In a first aspect combinable with any of the general embodiments, the roller grill further includes a housing structure adapted to support the roller grill, where each of the multiple tubes is coupled to the housing structure by respective bearings.

In a second aspect combinable with any of the previous aspects, the frame is configured to rest upon one or more of the respective bearings.

In a third aspect combinable with any of the previous aspects, each of the one or more dividers includes engagement members forming respective apertures.

In a fourth aspect combinable with any of the previous aspects, the frame includes rails configured to support the one or more dividers, where each of the rails includes a groove formed to engage the respective apertures.

In a fifth aspect combinable with any of the previous aspects, the engagement members of a divider are pivotable with respect to a longitudinal body of the divider, such that the respective apertures of the engagement members can engage respective grooves of the rails.

In a sixth aspect combinable with any of the previous aspects, each of the one or more dividers includes a flexible member adapted to contact the multiple tubes, where the flexible member is adapted to be removable from a respective divider.

In a seventh aspect combinable with any of the previous aspects, the flexible member includes a food sanitary graded material.

In an eighth aspect combinable with any of the previous aspects, the device further includes a display securable to a divider of the one or more dividers, where the display is adapted to provide printed content and is movable to an infinite number of positions along a length of the divider.

In a ninth aspect combinable with any of the previous aspects, each of the multiple tubes is coupled to the housing structure through respective bearings.

In a tenth aspect combinable with any of the previous aspects, the frame is configured to rest upon one or more of the respective bearings without contact with the housing structure.

In an eleventh aspect combinable with any of the previous aspects, the divider includes engagement members forming respective apertures at distal and proximal ends.

In a twelfth aspect combinable with any of the previous aspects, the frame includes rails configured to support the divider, where each of the rails includes a groove formed to engage the respective apertures.

In a thirteenth aspect combinable with any of the previous aspects, the engagement members of the divider are pivotable with respect to a lengthwise dimension of the divider, such that the respective apertures of the engagement members can engage respective grooves of the rails.

In a fourteenth aspect combinable with any of the previous aspects, the divider is adapted to adjust to two or more positions along the rails.

In a fifteenth aspect combinable with any of the previous aspects, the divider includes a removable flexible member adapted to contact the multiple tubes.

In a sixteenth aspect combinable with any of the previous aspects, the roller grill further includes a display coupled to the divider, where the display is configured to adjust to multiple positions along a length of the divider.

In a seventeenth aspect combinable with any of the previous aspects, the support structure is configured to rest upon one or more bearings mounted on the multiple roller grill heating tubes.

In an eighteenth aspect combinable with any of the previous aspects, each of the one or more partition members includes engagement members forming respective openings.

In a nineteenth aspect combinable with any of the previous aspects, the support structure includes frame members configured to support the one or more partition members, where each of the frame members includes a recess formed to engage the respective openings.

In a twentieth aspect combinable with any of the previous aspects, the engagement members of a partition member are pivotable with respect to a longitudinal body of the partition member, such that the respective openings of the engagement members can engage respective recesses of the frame members.

In a twenty-first aspect combinable with any of the previous aspects, each of the one or more partition members includes a flexible member adapted to contact the multiple roller grill heating tubes, where the flexible member is adapted to be removable from a respective partition member.

In a twenty-second combinable with any of the previous aspects, the roller grill divider assembly includes a display panel securable to a particular partition member, where the display panel is adapted to adjust to multiple positions along a length of the particular partition member.

Various embodiments of a roller grill divider assembly according to the present disclosure may include one or more of the following advantages. For example, the roller grill divider assembly may be mounted atop bearings mounted on tubular heating members to avoid mechanical wear and/or force on other components of the roller grill. As another example, the roller grill divider assembly may substantially prevent one or more food products heating on one area of the tubular members from moving (e.g., sliding) to another area of the tubular members. As another example, the roller grill divider assembly may help prevent food product from interfering with the rotation of the heating tubes. One or more dividers of the roller grill divider assembly may be adjusted to a desired position of any number (e.g., an infinite number) of positions along one or more mounting rails. Thus, a heating or cooking area of the roller grill defined by the tubular heating members may be subdivided into two, three, four, or any other number of sub-portions. Further, such sub-portions may be dynamically adjustable (e.g., by adding or removing dividers). As another example, the roller grill divider assembly may be designed to be easily cleanable, sterilizable, and/or replaceable.

Various embodiments of a roller grill divider assembly according to the present disclosure may also include one or more of the following advantages. For example, one or more display boards may display various content related to the food products resting atop the heating tubes in each sub-portion of the cooking and/or heating area. Such instructions may include information for heating or otherwise preparing the food products or other information related to the condition of the food products. In some embodiments, the display board or the panel of the display board may be color coded to indicate such information. In some examples, the panel may receive direct printing or an adhesive media.

These general and specific aspects may be implemented using a device, system or method, or any combinations of devices, systems, or methods. The details of one or more implementations are set forth in the accompanying drawings and the description below. Other features, objects, and advantages will be apparent from the description, the drawings, and the claims.

DETAILED DESCRIPTION

This disclosure relates to a roller grill for heating and/or reheating precooked food products, and more particularly, to a roller grill including a roller grill divider that subdivides a cooking and/or heating area of the roller grill defined by one or more heating tubes into multiple subportions. In a general embodiment, a roller grill includes two side housings, a bottom housing, and multiple heating tubes that are disposed parallel to one another, across a volume defined between upper regions of opposite panels of the two side housings, and above the bottom housing. The heating tubes are positioned sufficiently close to one another, such that their positioning allows a pre-cooked food product to simultaneously rest atop two adjacent heating tubes. The heating tubes are further designed to rotate (e.g., 360 degrees) and have outer surfaces that are adapted to transfer heat to pre-cooked food products, thereby allowing the heating tubes to heat and/or reheat pre-cooked food products that rest atop the heating tubes. The roller grill further includes a roller grill divider assembly having a frame and one or more dividers releasably secured to the frame. The frame includes one or more support members attached to one or more mounting rails.

In some embodiments, a divider includes a rigid partition member, a flexible strip secured to a bottom edge of the partition member, and two opposing, flexible engagement members disposed at each end of the divider. Each engagement member includes a base and a flange extending from the base to form an aperture. In some embodiments, the aperture has a rectangular shape and is sized and formed to engage the notches. The ends of the partition members each include a cutout sized to engage a spring adapted to exert a force on the base of the engagement member, such that the engagement member exerts a frictional force on the mounting rail.

In some examples, the divider may be adjusted (e.g., slid) to a desired position along the mounting rails. In some embodiments, the partition members of the dividers provide stable sectioning for the food products resting atop the heating tubes, and the flexible strip is in contact with the heating tubes while the roller grill divider assembly rests upon the roller grill. In this manner, the flexible strip may substantially prevent the food products from passing beneath the divider and interfering with the rotation of the heating tubes. A divider may be removed from the frame by sliding the divider along the mounting rails until the apertures of the engagement members are aligned with the respective notches on the mounting rails. The divider can then be lifted upwards and away from the frame. The roller grill divider assembly or one or more of the dividers may be removed from the roller grill at any time that a temperature of the roller grill divider assembly permits handling of the roller grill divider assembly. In some examples, the flexible strips of the dividers may be easily removed from the dividers so that the flexible strips can be cleaned, sterilized, or replaced.

In some embodiments, the roller grill further includes one or more display boards that may be affixed to (e.g., rest upon, be mounted on, or be installed onto) the roller grill divider assembly and that can display various content related to the food products resting atop the heating tubes. In some embodiments, the display board includes a panel from which opposing flanges extend to form horizontal channels. In some examples, thin surfaces can be slid through the channels and thereby releasably secured to the panel. In some embodiments, a base extends from a lower edge of the panel and is coupled to a u-shaped mounting frame formed to engage the partition members. In some examples, the display board may be used to display instructions for heating or otherwise preparing the food products or other information related to the condition of the food products. In some embodiments, the display board or the panel of the display board may be color coded to indicate such information. In some examples, the panel may receive direct printing or an adhesive media.

Figure 1:
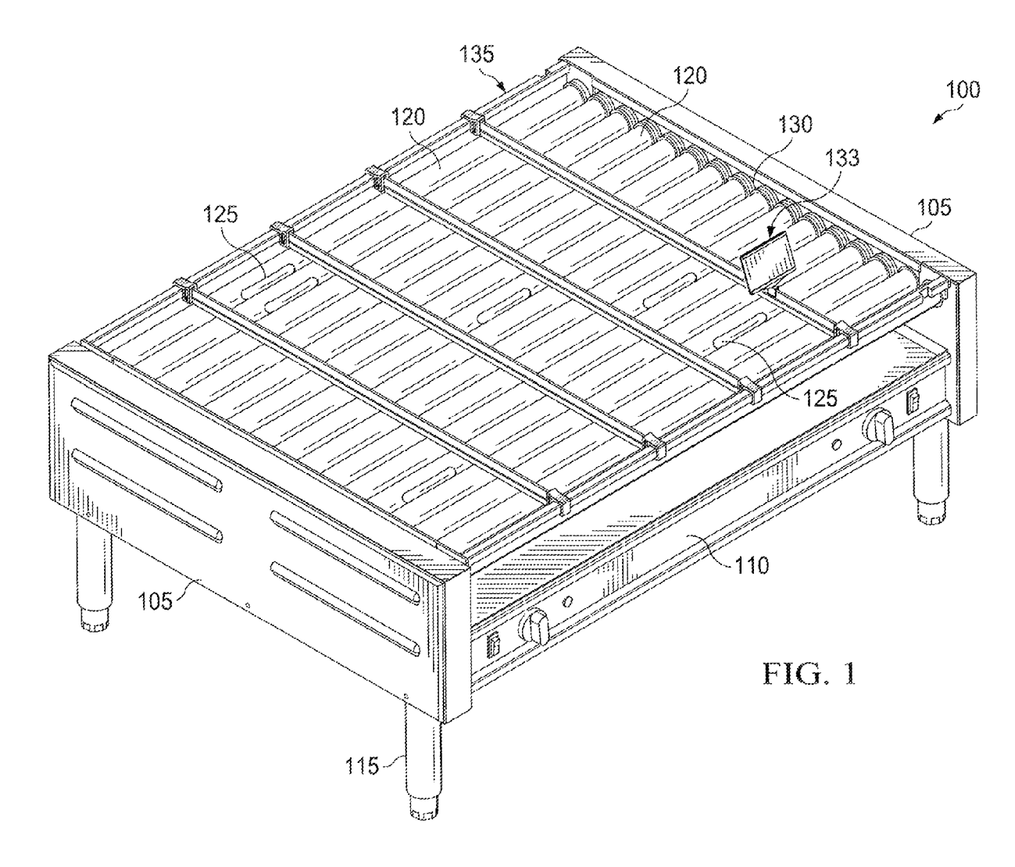
FIG. 1 illustrates a view of an example roller grill for cooking and/or heating food products including an example embodiment of a roller grill divider assembly.

FIG. 1 illustrates an isometric view of an example embodiment of a roller grill 100 for heating and/or reheating pre-cooked food products, such as, for example, cylindrically shaped pre-cooked food products including hotdogs, sausage links, and other products. The roller grill 100 includes two side housings 105 and a bottom housing 110 that is attached to and disposed between lower regions of panels of the two side housings 105. The weight of the roller grill 100 is supported by multiple legs 115 that are mounted underneath and near corners of the side housings 105. The roller grill 100 further includes multiple heating tubes 120 that are disposed parallel to one another, across a volume defined between upper regions of opposite panels of the two side housings 105 and above the bottom housing 110. The heating tubes 120 are positioned sufficiently close to one another, such that their positioning allows a pre-cooked food product 125 to simultaneously rest atop two adjacent heating tubes 120. Support bearings 130 are positioned at each end of each heating tube 120 and remain stationary while the heating tubes 120 rotate. A roller grill divider assembly 135 may rest upon (e.g., be mounted atop or installed onto) one or more of the four corner (outermost) bearings 130 to partition a cooking and/or heating area defined by the heating tubes 120 into two or more subportions. In some embodiments, a display board 133 may be affixed to (e.g., rest upon, be press fitted, be mounted atop, or be installed onto) the roller grill divider assembly 135 to display various content related to the food products 125 resting atop the heating tubes 120.

In some embodiments, the roller grill 100 may be approximately 36 inches in total length, and the heating tubes 120 may be approximately 35.625 inches in length. In some examples, the wall thickness of a heating tube may be between approximately 3/64 inches and approximately 1/16 inches. In some examples, the width of the roller grill 100 may depend on the number of heating tubes 120 included within the roller grill 100. In some examples, the roller grill 100 can include multiple (e.g., 4, 8, 16, or other number) heating tubes 120.

In some embodiments, the heating tubes 120 have outer surfaces that are adapted to transfer heat to the pre-cooked food products 125 (e.g., non-stick surfaces, cleanable surfaces, or other surfaces). The heating tubes 120, in some embodiments, are further designed to rotate 360 degrees, which consequently rotates the pre-cooked food products 125 360 degrees that are in contact with the heating tubes 120. The heating tubes 120 may be heated by multiple electric resistive heat elements. In some embodiments, at least one of the electric resistive heat elements may be disposed within a bore of at least one of the heating tubes 120. In some examples, the heat conducted to the surfaces of the heating tubes 120 allows them to heat/and or reheat the pre-cooked food products 125. In some instances, the electric resistive heat elements can enable the surface temperatures of the heating tubes 120 to reach up to approximately 300° F. In any event, the heating tubes 120 can heat the pre-cooked food products 125 to an internal temperature of about 160° F. or to another temperature to ensure that any bacteria is killed and/or eliminated.

Figure 2:
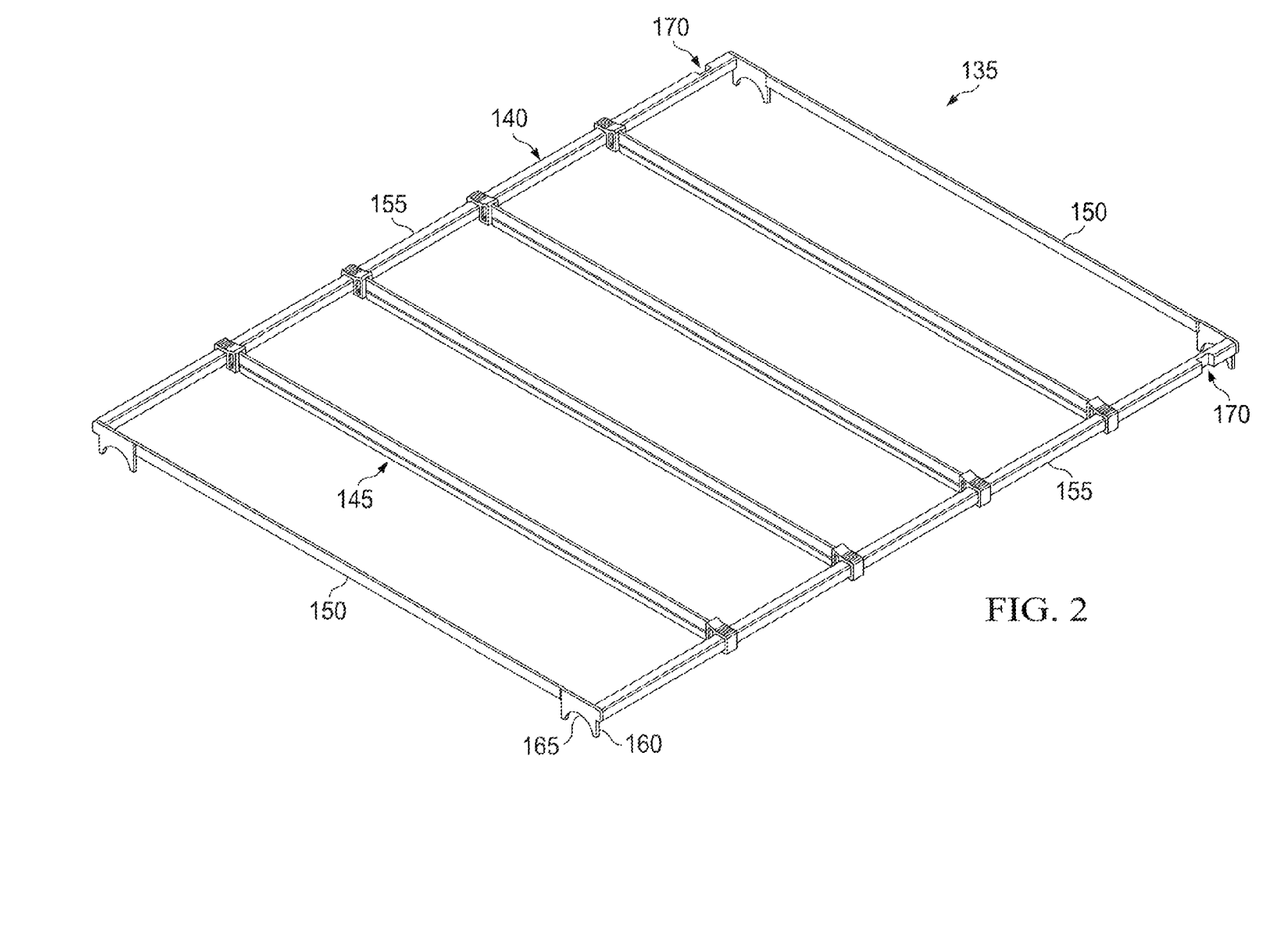
FIG. 2 illustrates a view of an example embodiment of a roller grill divider assembly for partitioning heating areas of a roller grill.

FIG. 2 illustrates an isometric view of the roller grill divider assembly 135 that can rest upon (e.g., be mounted to or be installed onto) the roller grill 100 to partition the cooking and/or heating area defined by the heating tubes 120 into two or more subportions. The illustrated roller grill divider assembly 135 includes a frame 140 and four dividers 145 releasably secured to the frame 140. The frame 140 includes two support members 150 attached to two mounting rails 155. A tab 160 extends from each end of each support member 150 and is formed to be supported by the outermost bearings 130 supporting the outermost heating tubes 120 of the roller grill 100 (see FIG. 1). The tabs 160 include semi-circular shaped edges 165 sized to allow the tabs 160 to rest atop the bearings 130. The mounting rails 155 have rectangular walls, and each mounting rail 155 includes one respective rectangular notch 170. The notch 170 is disposed near an end of the mounting rail 155 and is sized to engage the dividers 145. Notches 170 on the opposing mounting rails 155 are aligned such that one divider 145 can engage both notches 170 simultaneously.

Figure 3A:
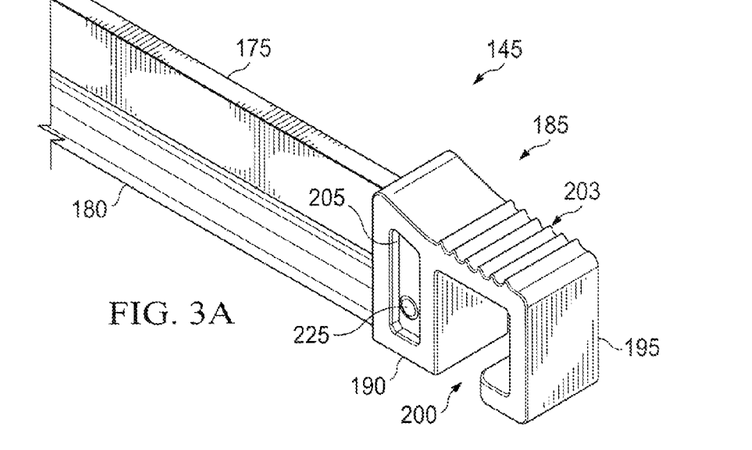
FIGS. 3A-3B illustrate views of an example embodiment of a divider included within a roller grill divider assembly.
Figure 3B:
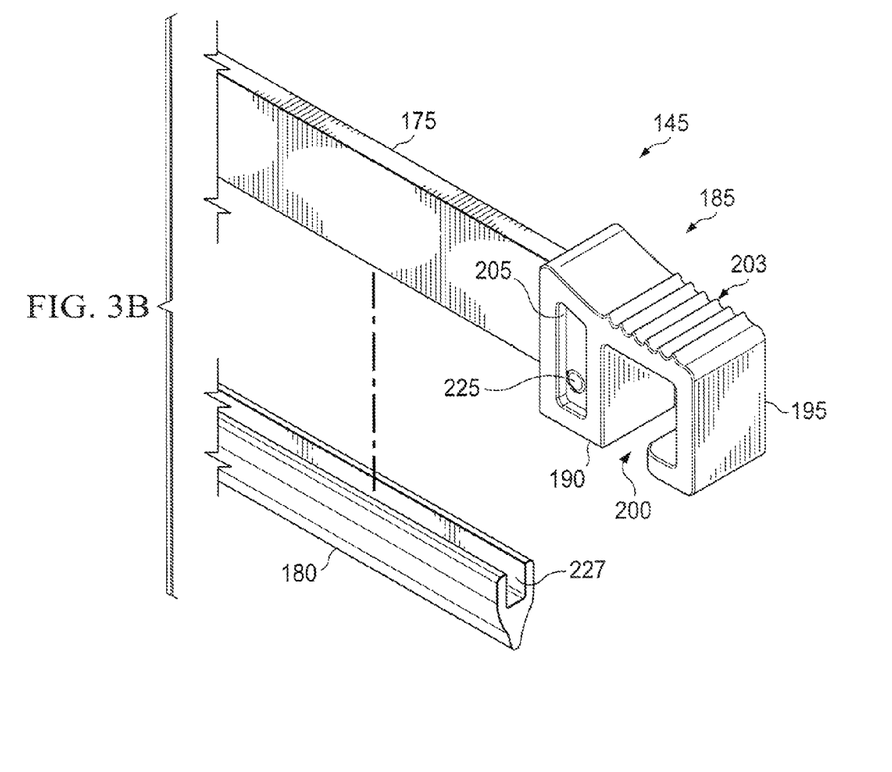

FIGS. 3A-3B illustrate isometric views of a divider 145. The illustrated divider 145 includes a rigid partition member 175, a flexible strip 180 secured to a bottom edge of the partition member 175, and two opposing, flexible engagement members 185 (only one engagement member 185 shown in FIGS. 3A-3B) disposed at each end of the divider 145. Each engagement member 185 includes a base 190 and a flange 195 extending from the base 190 to form an aperture 200. The aperture 200 has a rectangular shape and is sized and formed to engage the notches 170. Multiple ridges 203 extend from a top surface of the flange 195 and provide a gripping surface for the engagement member 185. The base 190 includes two opposing elongate recesses 205 (only one elongate recess 205 shown in FIGS. 3A-3B), through which a pin 225 extends. Referring particularly to FIG. 3B, the illustrated flexible strip 180 includes a slot 227 into which the partition member 175 is seated and is spaced a small distance from the base 190 that is sufficient to provide a clearance for pivotal motion of the base 190. The engagement members 185 are configured to engage the mounting rails 155 such that the divider 145 can be moved along a length of the mounting rails 155.

Figure 4A:
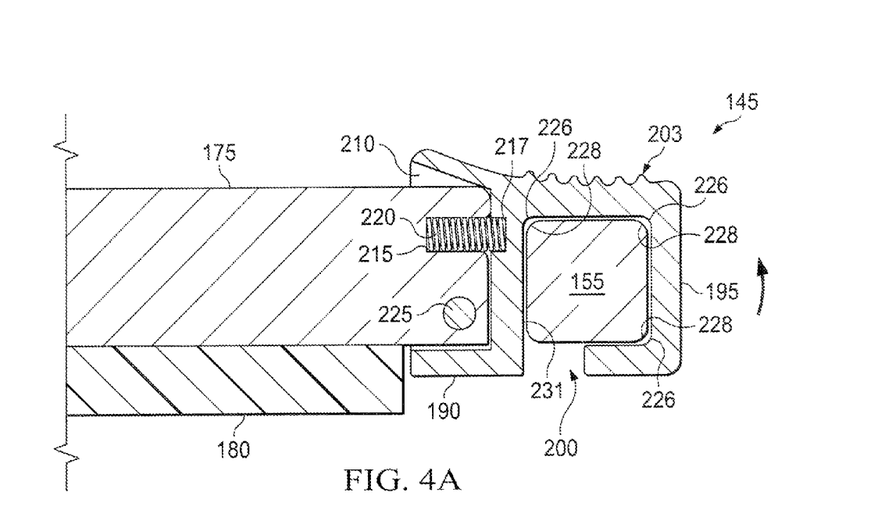
FIGS. 4A-4B illustrate views of an example embodiment of a divider assembled with a frame of a roller grill divider assembly.
Figure 4B:
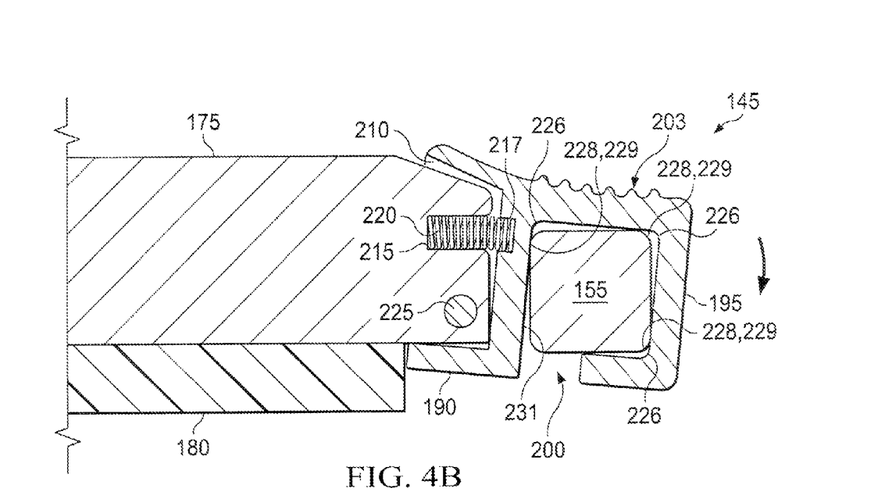

FIGS. 4A-4B illustrate cross-sectional views of the divider 145 engaged with the mounting rail 155 in a configuration in which the divider 145 is movable along the length of the mounting rail 155 (FIG. 4A) and a configuration in which the divider 145 is fixed at a position along the length of the mounting rail 155. The partition member 175 extends into a hollow region 210 formed within the base 190. The ends of the partition members 175 each include a cutout 215 sized to engage a spring 220 (e.g., a compression spring) housed within the hollow region 210 and adapted to extend within a round recess 217 formed within the base 190. The spring 220 exerts a force on the base 190, such that the engagement member 185 exerts a frictional force on the mounting rail 155. The pin 225 extends through the end of the partition member 175 such that the engagement member 185 can pivot about the pin 225 and relative to the end of the partition member 175.

Referring particularly to FIG. 4A, the divider 145 may be movable along the length of the mounting rails 155 when three internal corners 226 of the flanges 195 are substantially aligned with three respective corners 228 of the mounting rails 155 such that the engagement members 185 can freely slide along the mounting rails 155. Referring particularly to FIG. 4B, the divider 145 may be fixed to the mounting rails 155 at a particular position along the length of the mounting rails 155 when the engagement members 185 are rotated about the pins 225 such that the three internal corners 226 of the flanges 195 are substantially offset from the three respective corners 228 of the mounting rails 155. The offsets between the three internal corners 226 of the flanges 195 and the three respective corners 228 of the mounting rails 155 provide pressure points of contact 229 between the three respective corners 228 of the mounting rails 155 and the interior walls 231 of the flanges 195. The pressure points of contact 229 accordingly provide an amount of friction sufficient to substantially prevent the divider 145 from sliding along the mounting rails 155.

In some examples, the support members 150 may be welded to the mounting rails 155. In some embodiments, the support members 150 and the mounting rails 155 may be approximately 25 inches and 32 inches in length, respectively. In some embodiments, the support members 150 and the mounting rails 155 may be made of aluminum, which allows the support members 150 and the mounting rails 155 to be welded to one another and provides the support members 150 and the mounting rails 155 with a light weight, a natural finish, good dimensional tolerancing, and a resistance to high temperature. Forming the support members 150 and the mounting rails 155 from aluminum further may remove a need to paint or plate surfaces of the support members 150 and the mounting rails 155 and allows the support members 150 and the mounting rails 155 to withstand abrasive cleaning and sterilization. In some embodiments, the support members 150 and the mounting rails 155 may alternatively be made of one or more materials including plastics, stainless steel, or steel.

Figure 5:
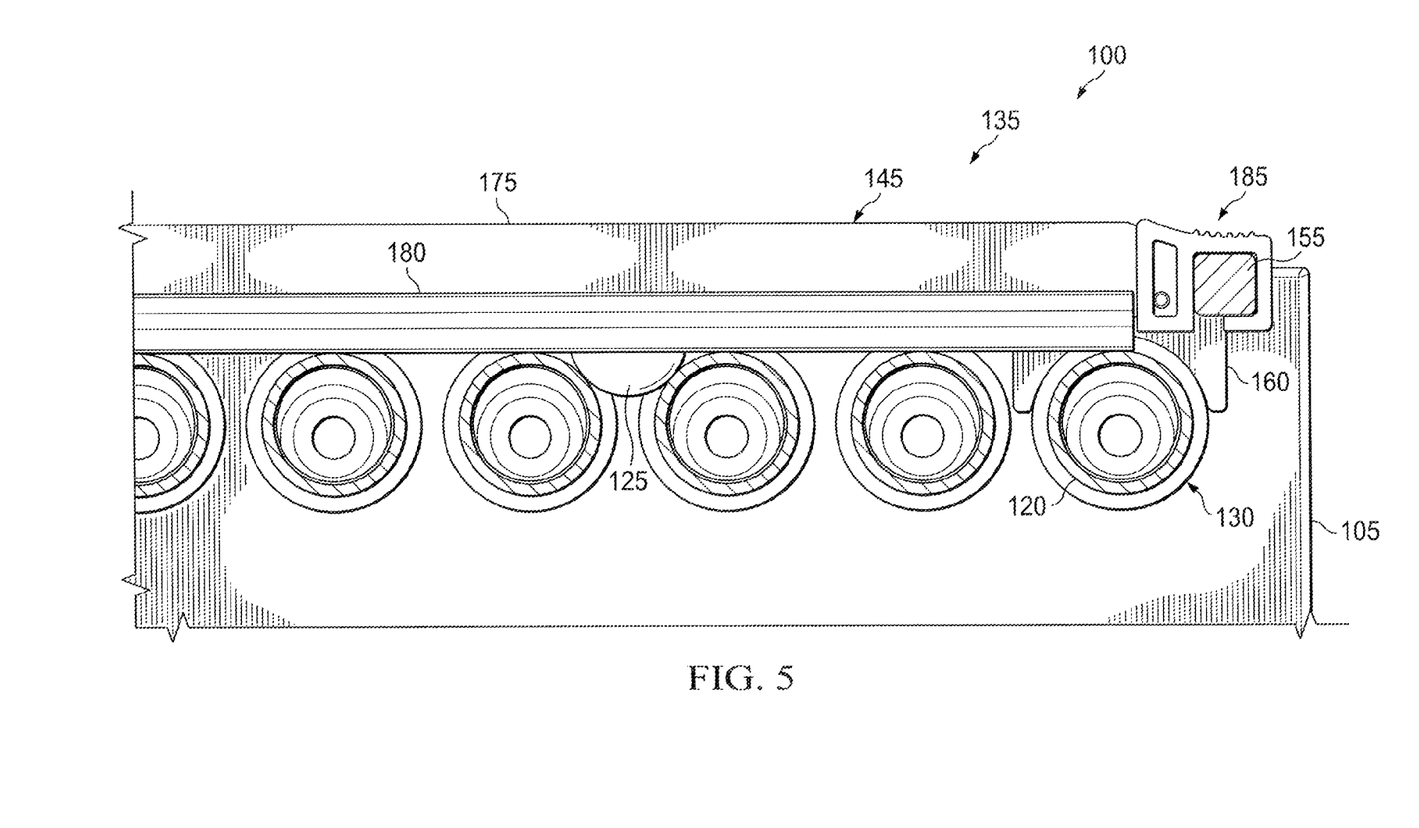
FIG. 5 illustrates another view of an example roller grill for heating and/or reheating precooked food products including an example embodiment of a roller grill divider assembly.

FIG. 5 illustrates a cross-sectional side view of the roller grill 100. The partition members 175 of the dividers 145 provide stable sectioning of the cooking and/or heating area defined by the heating tubes 120. The flexible strip 180 is in contact with the heating tubes 120 (e.g., all, most, or one or more of the heating tubes 120) while the roller grill divider assembly 135 rests upon (e.g., is mounted upon or installed onto) the roller grill 100. In this manner, the flexible strip 180 substantially prevents the food products 125 from passing beneath the divider 145 and thereby prevents the food products 125 from interfering with the rotation of the heating tubes 120.

In some embodiments, the radii of the edges 165 of the tabs 160 may be approximately 0.700 inches; other dimensions, however, are within the scope of the present disclosure. In some embodiments, the notches 170 may be approximately 0.600 inches in width; other dimensions, however, are within the scope of the present disclosure. In some examples, the partition members 175 and the flexible strips 180 may be press fitted together. In some embodiments, the flexible strip may be made of a National Sanitation Foundation (NSF™) graded material, such as silicone. In some embodiments, the spring 220 and the pin 225 may be made of stainless steel, which provides the spring 220 and the pin 225 with a resistance to corrosion, a resistance to high temperature, and long-term durability. In some embodiments, the spring 220 and the pin 225 may be made of one or more other materials. In some embodiments, the engagement member 185 may be injection molded from a plastic, such as a 20% glass fiber filled polyphenylene oxide (PPO) or a blend of PPO and polystyrene (e.g., a Noryl™ brand plastic). Such moldable plastics provide the engagement member 185 with a light weight, precise detailing of features, good dimensional tolerancing, a resistance to high temperature, and a resistance to abrasion. In some embodiments, the engagement members 185 may be made of one or more other materials. In some embodiments, the roller grill divider assembly 135 may include more than four dividers 145 or fewer than four dividers 145.

Figure 6:
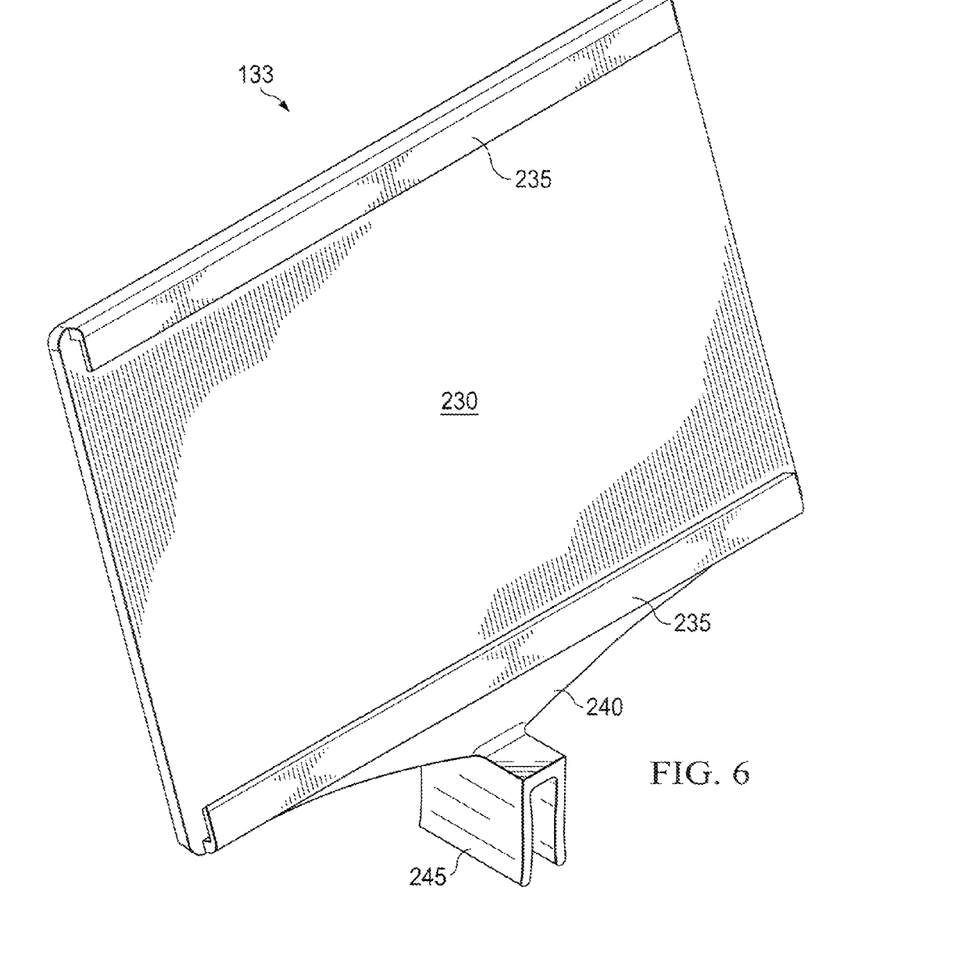
FIG. 6 illustrates a view of an example embodiment of a display board for displaying content related to food products cooked and/or heated on a roller grill.

FIG. 6 illustrates a view of the display board 133 that can be mounted atop (e.g., rest upon, affixed to, or installed onto) the roller grill divider assembly 135. The display board 133 includes a panel 230 from which opposing flanges 235 extend to form horizontal channels. In some examples, thin surfaces (e.g., printed paper or plastic surfaces) can be slid through the channels and thereby releasably secured to the panel 230. A base 240 extends from a lower edge of the panel 230 and is coupled to a mounting frame 245 formed to engage the partition members 175. The mounting frame 245 is formed as a u-shaped channel member sized to securely rest atop the partition members 175. The display board 133 may be used, for example, to display various content related to the food products 125, such as instructions for heating or otherwise preparing the food products 125 or other information related to the condition of the food products 125. In some embodiments, the display board 133 or the panel 230 of the display board 133 may be color coded to indicate such information. In some examples, the panel 230 may receive direct printing (e.g., a hotstamp) or an adhesive media (e.g., a vinyl sticker).

In some embodiments, a length and a height of the panel 230 are approximately 3 inches and 2 inches, respectively; other dimensions, however, are within the scope of the present disclosure. In some embodiments, an internal width of the mounting frame 245 is approximately 0.115 inches; other dimensions, however, are within the scope of the present disclosure. In some embodiments, the display board 133 may be made of a polycarbonate plastic, which may provide the display board 133 with a glossy surface finish, a degree of transparency, and a resistance to high temperature. In some embodiments, the display board 133 may be made of another material.

In operation, the roller grill divider assembly 135 can be placed upon (e.g., can rest upon, be mounted upon, or be installed onto) the roller grill 100 to partition the cooking and/or heating area defined by the heating tubes 120 into two or more subportions. With particular reference to FIGS. 1 and 5, the engagement members 185 of the divider 145 are brought in close proximity to the respective, opposing notches 170 on the mounting rails 155 of the frame 140. The apertures 200 of the engagement members 185 are aligned with the respective notches 170, and the divider 145 is placed on the frame 140 such that the engagement members 185 rest on the mounting rails 155 at a location of the notches 170. With particular reference to FIG. 4A, the engagement members 185 are rotated (denoted by the arrow in FIG. 4A) towards a top surface of the partition member 175, such that the springs 220 are compressed by the bases 190 of the engagement members 185 and the internal corners 226 of the flanges 195 are substantially aligned with the three respective corners 228 of the mounting rails 155. The engagement members 185 are held in such a rotated position to allow movement of the divider 145 along the length of the mounting rails 155. The divider 145 is adjusted (e.g., slid) to a desired position along the mounting rails 155.

Referring particularly to FIG. 4B, the engagement members 185 are released from the rotated position, allowing the springs 220 to extend within the recesses 217 of the bases 190. In extended configurations, the springs 220 apply forces to the recesses 217 of the bases 190, thereby causing the engagement members 185 to rotate (denoted by the arrow in FIG. 4B) towards a bottom surface of the flexible strip 180. The rotated positions of the engagement members 185 provide the pressure points of contact 229 between the mounting rails 155 and the flanges 195 of the engagement members 185. The friction at the pressure points of contact 229 secure the engagement members 185 to the mounting rails 155 and maintain the divider 145 at the desired position.

In the same manner, any number of additional dividers 145 may be sequentially assembled with the frame 140 of the roller grill divider assembly 135. A divider 145 may be easily removed from the frame 140 by rotating the engagement members 185 towards the top surface of the partition member 175 and adjusting (e.g., sliding) the divider 145 along the mounting rails 155 until the apertures 200 of the engagement members 185 are aligned with the respective notches 170 on the mounting rails. The divider 145 can then be lifted upwards and away from the frame 140.

The roller grill divider assembly 135 may be placed atop the roller grill 100 such that the tabs 160 extending from the frame 140 rest atop the outermost bearings 130 supporting the outermost heating tubes 120 (e.g., heating tubes 120 nearest a front side and rear side of the roller grill 100). The flexible strips 180 of the one or more dividers 145 are in contact with the heating tubes 120 (e.g., all, some, or one or more), thereby preventing food products 125 from passing beneath the one or more dividers 145. In some examples, the dividers 145 can be repositioned along the mounting rails 155, assembled with the frame 140, or removed from the frame 140 after the roller grill divider assembly 135 has been mounted on the roller grill 100. During operation of the roller grill 100, heat is transferred from the multiple heating tubes 120 to the roller grill divider assembly 135. The roller grill divider assembly 135 or one or more of the dividers 145 may be removed from the roller grill 100 at any time that a temperature of the roller grill divider assembly 135 permits handling of the roller grill divider assembly 135.

One or more display boards 133 may be press fitted at a desired position of any number of infinite positions along any partition member 175 of any divider 145. In some examples, a display board 133 can be assembled with the roller grill divider assembly 135 before the roller grill divider assembly 135 is mounted on the roller grill 100. In other examples, a display board 133 can be assembled with the roller grill divider assembly 135 after the roller grill divider assembly 135 is mounted on the roller grill 100.

In some examples, the flexible strips 180 of the dividers 145 may be easily removed from the dividers 145 so that the flexible strips 180 can be cleaned, sterilized, or replaced. With particular reference to FIG. 3B, the flexible strips 180 can subsequently be reassembled with the partition members 175 of the dividers 145.

A number of embodiments have been described. Nevertheless, it will be understood that various modifications may be made. For example, the heating tubes 120 of the roller grill 100 may have a width that is different than approximately 35.625 inches, and the roller grill divider assembly 135 may accordingly be sized to accommodate the different length and width. Furthermore, various combinations of the components described herein may be provided for embodiments of a similar apparatus. Accordingly, other embodiments are within the scope of the present disclosure.

What is claimed is:

1. A device, comprising:
a frame supported on a roller grill that comprises rails and a plurality of tubes having outer surfaces that transfer heat to a pre-cooked food product, each tube configured to fully rotate to rotate the pre-cooked food product 360 degrees while the pre-cooked food product is in contact with the tube; and
one or more dividers securable to the frame, each of the one or more dividers comprising:
two opposing engagement members arranged such that one of the two engagement members is disposed at each end of the divider to engage a notch in one of the rails, the engagement members adjustable along a length of the frame to a plurality of positions such that the pre-cooked food product is substantially prevented from passing beneath the one or more dividers, at least one of the two engagement members comprising a base and a flange that extends from the base to form an aperture sized and formed to engage the notch, the base comprising a pin that extends therethrough to form a pivot;
a rigid partition member; and
a flexible member secured to a bottom edge of the partition member,
wherein the one or more dividers are supported by the rails, and a compression spring is at least partially enclosed in, and engaged by, a cutout at an end portion of each of the dividers to extend within a round recess formed within each of the engagement members, the compression spring biased to exert a force on the base such that each of the engagement members exerts a frictional force on each of the rails, and each of the engagement members pivots about each pin relative to the end portion of each of the partition members.

2. The device of claim 1, wherein the roller grill further comprises a housing structure coupled through bearings to the plurality of tubes.

3. The device of claim 2, wherein the frame rests upon one or more of the bearings.

4. The device of claim 1, wherein the engagement members of a particular divider of the one or more dividers are pivotable with respect to a longitudinal body of the particular divider.

5. The device of claim 1, wherein each flexible member is removably secured to the bottom edge of the partition member and in contact with the plurality of tubes.

6. The device of claim 5, wherein each flexible member comprises a food sanitary graded material.

7. The device of claim 1, further comprising a display securable to a divider of the one or more dividers, the display providing printed content and being movable to a multiple number of positions along a length of the divider.

8. A roller grill, comprising:
a housing structure that supports the roller grill;
a plurality of tubes disposed between opposed portions of the housing structure and having outer surfaces that transfer heat to a pre-cooked food product, each tube configured to fully rotate to rotate the pre-cooked food product 360 degrees while the pre-cooked food product is in contact with the tube; and
a roller grill divider assembly comprising:
a frame that comprises rails and is supported by at least one of the housing structure or the plurality of tubes; and
a divider securable to the frame and extending across a width of the frame that is orthogonal to a length of the plurality of tubes that extend lengthwise between the opposed portions of the housing structure, and adjustable to two or more positions along a length of the frame, the divider comprising:
- a rigid partition member,
- a flexible member secured to a bottom edge of the partition member, and
- two opposing engagement members to engage notches of the rails, the engagement members arranged such that one of the two engagement members is disposed at each end of the divider, at least one of the two engagement members comprising a base and a flange that extends from the base to form an aperture sized and formed to engage one of the notches, the base comprising a pin that extends therethrough to form a pivot, wherein the divider is supported by each of the rails, and a compression spring is at least partially enclosed in, and engaged by, a cutout at an end portion of the divider to extend within a round recess formed within each of the engagement members, the compression spring biased to exert a force on each of the bases such that each of the engagement members exerts a frictional force on each of the rails, and each of the engagement members pivots about each of the pins relative to the end portion of the partition member.

9. The roller grill of claim 8, wherein each of the plurality of tubes is coupled to the housing structure through bearings.

10. The roller grill of claim 9, wherein the frame rests upon one or more of the bearings without contact with the housing structure.

11. The roller grill of claim 8, wherein each engagement member engages each notch at least at one of a distal end or proximal end of the divider.

12. The roller grill of claim 8, wherein each of the engagement members of the divider is pivotable with respect to a lengthwise dimension of the divider.

13. The roller grill of claim 8, wherein the divider is adjustable to two or more positions along the rails.

14. The roller grill of claim 8, wherein the flexible member comprises a removable flexible member that contacts the plurality of tubes.

15. The roller grill of claim 8, further comprising a display coupled to the divider, the display adjustable to a plurality of positions along a length of the divider.

16. A roller grill divider assembly, comprising:
- a support structure comprising frame members and tabs that rest on a roller grill adjacent a plurality of roller grill heating tubes of the roller grill, each heating tube configured to fully rotate to rotate the pre-cooked food product 360 degrees while the pre-cooked food product is in contact with the heating tube; and
- one or more partition members securable to the support structure that extend transverse to a lengthwise dimension of the plurality of roller grill heating tubes, each of the one or more partition members adjustable to a plurality of positions along a length of the support structure, each partition member comprising:
  - a rigid portion,
  - a flexible member secured to a bottom edge of the rigid portion, and
  - two opposing engagement members arranged such that one of the two engagement members is disposed at each end of the partition member, at least one of the two engagement members comprises a base and a flange that extends from the base to form an aperture sized and formed to engage one of the notches, the base comprising a pin that extends therethrough to form a pivot, wherein the one or more partition members are supported by the frame members, each of the frame members comprising a plurality of notches, the engagement members engaging the notches, and a compression spring is at least partially enclosed in, and engaged by, a cutout at an end portion of the partition member to extend within a round recess formed within each of the engagement members, the compression spring biased to exert a force on each of the bases such that each of the engagement members exerts a frictional force on the frame member, and each of the engagement members pivots about each of the pins relative to the end portion of the partition member.

17. The roller grill divider assembly of claim 16, wherein the support structure rests upon one or more bearings mounted on the plurality of roller grill heating tubes.

18. The roller grill divider assembly of claim 16, wherein the engagement members of the one or more partition members are pivotable with respect to a longitudinal body of the one or more partition members.

19. The roller grill divider assembly of claim 16, wherein each flexible member contacts the plurality of roller grill heating tubes, and each flexible member is removable from the partition member.

20. The roller grill divider assembly of claim 16, further comprising a display panel securable to a particular partition member, the display panel adjustable to a plurality of positions along a length of the particular partition member.

* * * * *